US006992620B2

(12) United States Patent
Doi

(10) Patent No.: US 6,992,620 B2
(45) Date of Patent: Jan. 31, 2006

(54) CALIBRATION METHOD AND RADIO APPARATUS

(75) Inventor: Yoshiharu Doi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/950,521

(22) Filed: Sep. 28, 2004

(65) Prior Publication Data
US 2005/0070333 A1    Mar. 31, 2005

(30) Foreign Application Priority Data
Sep. 29, 2003    (JP)    .............................. 2003-337764

(51) Int. Cl.
    *H01Q 3/22*    (2006.01)
(52) U.S. Cl. ...................... 342/368; 342/372; 342/374
(58) Field of Classification Search ................ 342/173, 342/174, 368, 372, 373, 374
    See application file for complete search history.

(56) References Cited

U.S. PATENT DOCUMENTS 6,864,839 B2 *   3/2005   Hamada et al. ............. 342/442

FOREIGN PATENT DOCUMENTS

JP         2002-76746         3/2002

* cited by examiner

*Primary Examiner*—Dao Phan
(74) *Attorney, Agent, or Firm*—McDermott Will & Emery LLP

(57) ABSTRACT

A signal processing unit carries out signal processings necessary for a receiving/transmission processing of an adaptive array antenna. The signal processing unit also carries out a signal processing necessary for determining phase errors in quadrature modulation and quadrature detection to be done by radio units, namely, for determining a rotation amount of an initial phase correction value. The radio units in a base station apparatus carry out frequency conversion processing, amplification processing, quadrature modulation processing, quadarture detection processing, A-D or D-A conversion processing and the like between the baseband signals and radio frequency signals. An initial phase correction value determining unit determines rotation amounts of initial phase correction values, based on power-measuring received signals inputted from the radio units, and outputs to the signal processing unit as initial phase correction value signals.

18 Claims, 11 Drawing Sheets

CALIBRATION METHOD AND RADIO APPARATUS

BACKGROUND OF THE INVENTION

1. Field of the Invention

The present invention relates to calibration technologies and it particularly relates to a calibration method and a radio apparatus utilizing the same in adaptive array antennas.

2. Description of the Related Art

In wireless communication, it is generally desired that the limited frequency resources be used effectively. Adaptive array antenna technology is one of the technologies that can realize effective utilization of frequency resources. In adaptive array antenna technology, the amplitude and phase of signals transmitted and received by a plurality of antennas, respectively, are so controlled as to form a directional pattern of the antenna. In other words, the apparatuses provided with adaptive array antennas change the amplitude and phase of signals received by a plurality of antennas, respectively, add up the thus changed received signals, and receive the signals equivalent to the signals received by the antenna having the directional pattern corresponding to the variation in said amplitude and phase (hereinafter referred to as "weight"). In addition, signals are transmitted in a directional pattern of the antenna corresponding to the weight.

One example of processings for weight computation in adaptive array antenna technology is a processing based on the MMSE (Minimum Mean Square Error) method. In the MMSE method, the Wiener solution is known to be the condition for an optimum weight value. Also known is a recurrence formula with smaller amounts of calculation than directly solving for the Wiener solution. For such recurrence formulas, adaptive algorithms, such as RLS (Recursive Least Squares) algorithm and LMS (Least Mean Squares) algorithm, are used (see, for example, Reference (1) in the following Related Art List).

Related Art List (1) Japanese Patent Application Laid-Open No. 2002-76746.

There are cases where a radio apparatus provided with a plurality of antennas that constitute the adaptive antenna includes quadrature modulators and quadrature detectors corresponding respectively to the plurality of antennas and there are also cases where a structure is such that phase shifters for shifting the phase of a predetermined local frequency signal by $\pi/2$ are separately provided for the quadrature detector and the quadrature modulator. For instance, there is a case where a radio apparatus is comprised of an RF chip including an quadrature modulator and an RF chip including an quadrature detector in a combined manner. If the phase shifter is constituted by flip-flops and the initial values of those flip-flops are not specified as predetermined values at the time of power-on, the phase of received signals may deviate by 180 degrees from that of signals to be transmitted. Such a case corresponds, for instance, to a case when the phase of a phase shifter at a transmitting apparatus side is +90 degrees and the phase thereof at a receiving side is −90 degrees or a case when the phase of a phase shifter at a transmitting apparatus side is −90 degrees and the phase thereof at a receiving side is +90 degrees. In such cases, even if the weights generated based on the received signals are implemented into signals to be transmitted, there will not be formed the weights for transmission that reflect the values of appropriate weights, so that the transmission beams therefor cannot be controlled normally.

SUMMARY OF THE INVENTION

The present invention has been made in view of the foregoing circumstances and an object thereof is to provide a calibration method for correcting phase errors of phase shifters at transmitting side and receiving side, and a radio apparatus utilizing said method.

A preferred embodiment according to the present invention relates to a radio apparatus. This apparatus comprises: a radio unit for reference which receives transmission signals from an antenna for measurement by an antenna for reference so as to derive a first weighting factor and which transmits, from the antenna for reference, signals weighted with the first weighting factor; a correcting radio unit which receives transmission signals from the antenna for measurement by an antenna for correction so as to derive a second weighting factor and which transmits, from the antenna for correction, signals weighted with the second weighting factor; a rotation unit which operates, at the time of transmitting signals, the second weighting factor while rotating a correction value against a $\pi/2$ phase shifter for transmission for performing quadrature modulation in the correcting radio unit; a measuring unit which receives signals transmitted from the antenna for reference and the antenna for correction by the antenna for measurement and which measures the strength of received signals according to an amount rotated by the rotation unit; and an estimation unit which estimates, according to the measured strength of received signals, a difference of phase in the $\pi/2$ phase shifter for transmission against a $\pi/2$ phase shifter for receiving with which to perform quadrature detection in the correcting radio unit. In this apparatus, the rotation unit may rotate the correction value by the phase difference estimated by the estimation unit.

By employing the above apparatus, the electric power of received signals becomes small if signals are transmitted after the weighting factors rotated by the rotation amount of an incorrectly set correction value, so that the rotation amount of a correct correction value can be estimated accurately.

The apparatus may further comprise an antenna switching unit which sets the antenna for correction while switching a plurality of antennas, and the estimation unit may estimate respectively phase differences for the correcting antennas to be switched among the plurality of antennas. The apparatus may further comprise a communication unit which communicates with a targeted terminal apparatus by using at least the antenna for measurement, the antenna for reference and the antenna for correction. The apparatus may further comprise: a communication unit which communicates with a targeted terminal apparatus by using at least the antenna for reference and the antenna for correction; and a transmitter which transmits signals from the antenna for measurement to respectively derive the first weighting factor and the second weighting factor. The difference of phase to be estimated by the estimation unit may be either 0 or $\pi$ and if the amount rotated by the rotation unit is either 0 or $\pi$, the measuring unit may measure the strength of received signals. The rotation unit may include: a storage unit which stores a correction value in a case when the difference of phase to be estimated by the estimation unit is 0; and an inversion unit which inverts the correction value if the correction value is rotated to $\pi$. The rotation unit may include: a first storage unit which stores a first correction value in a case when the difference of phase to be estimated by the estimation unit is 0; a second storage unit which stores a second correction value in a case when the difference of phase to be estimated by the estimation unit is $\pi$; and a selector which selects the first correction value or the second correction value according to the amount rotated by the rotation unit.

Where "if the amount rotated by the rotation unit is either 0 or $\pi$", the case of $\pi$ may be the inversion of a phase in a vector space and it will be acceptable as long as a value corresponding to the rotation of phase $\pi$ is obtained.

Another preferred embodiment according to the present invention relates to a calibration method. This method comprises: deriving a first weighting factor by receiving transmission signals from an antenna for measurement by an antenna for reference and transmitting, from the antenna for reference, signals weighted with the first weighting factor; deriving a second weighting factor by receiving transmission signals from the antenna for measurement by an antenna for correction and transmitting, from the antenna for correction, signals weighted with the second weighting factor which was operated while rotating a correction value, against a $\pi/2$ phase shifter for transmission, for performing quadrature modulation; receiving signals transmitted from the antenna for reference and the antenna for correction by the antenna for measurement and measuring the strength of received signals in units of a rotation amount of the correction value; estimating, according to the measured strength, a difference of phase in the $\pi/2$ phase shifter for transmission against a $\pi/2$ phase shifter for receiving with which to perform quadrature detection; and determining the rotation amount of the correction value to be the phase difference estimated by the estimating.

The method may further comprise setting the antenna for correction while switching a plurality of antennas. The method may further comprise communicating with a targeted terminal apparatus by using at least the antenna for measurement, the antenna for reference and the antenna for correction. The method may further comprise: communicating with a targeted terminal apparatus by using at least the antenna for reference and the antenna for correction; and transmitting from the antenna for measurement so as to respectively derive the first weighting factor and the second weighting factor. The difference of phase to be estimated by the estimating a difference of phase may be either 0 or $\pi$ and the measuring the strength of received signals may be such that the strength of received signals is measured if the rotation amount is either 0 or $\pi$. The transmitting may include: storing a correction value in a case when the difference of phase to be estimated in the estimating a difference of phase is 0; and inverting the correction value if the correction value is rotated to $\pi$. The transmitting may include: storing a first correction value in a case when the difference of phase to be estimated in the estimating a difference is 0; storing a second correction value in a case when the difference of phase to be estimated by the estimating a difference of phase is $\pi$; and selecting the first correction value or the second correction value according to the rotation amount.

Still another preferred embodiment according to the present invention relates to a program executable by a computer. This program includes the functions of: deriving a first weighting factor by receiving transmission signals from an antenna for measurement by an antenna for reference, storing the first weighting factor in a memory and transmitting, from the antenna for reference, signals weighted with the first weighting factor stored in the memory; deriving a second weighting factor by receiving transmission signals from the antenna for measurement by an antenna for correction, storing the second weighting factor in a memory and transmitting, from the antenna for correction, signals weighted with the second weighting factor which was operated while rotating a correction value on the memory, against a $\pi/2$ phase shifter for transmission, for performing quadrature modulation; receiving signals transmitted from the antenna for reference and the antenna for correction by the antenna for measurement and measuring the strength of received signals in units of a rotation amount of the correction value; storing the measured strength in the memory; estimating, according to the stored strength, a difference of phase in the $\pi/2$ phase shifter for transmission against a $\pi/2$ phase shifter for receiving with which to perform quadrature detection; and determining the rotation amount of the correction value to be the phase difference estimated by the estimating.

The functions of the program may further comprise setting the antenna for correction while switching a plurality of antennas. The functions of the program may further comprise communicating with a targeted terminal apparatus by using at least the antenna for measurement, the antenna for reference and the antenna for correction. The functions of program may further comprise: communicating with a targeted terminal apparatus by using at least the antenna for reference and the antenna for correction; and transmitting from the antenna for measurement so as to respectively derive the first weighting factor and the second weighting factor. The difference of phase to be estimated by the estimating a difference of phase may be either 0 or $\pi$ and the measuring the strength of received signals may be such that the strength of received signals is measured if the rotation amount is either 0 or $\pi$. The transmitting may include: storing a correction value in a case when the difference of phase to be estimated in the estimating a difference of phase is 0; and inverting the correction value if the correction value is rotated to $\pi$. The transmitting may include: storing a first correction value in a case when the difference of phase to be estimated in the estimating a difference is 0; storing a second correction value in a case when the difference of phase to be estimated by the estimating a difference of phase is $\pi$; and selecting the first correction value or the second correction value according to the rotation amount.

It is to be noted that any arbitrary combination of the above-described structural components and expressions changed between a method, an apparatus, a system, a recording medium, a computer program and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

Figure 1:
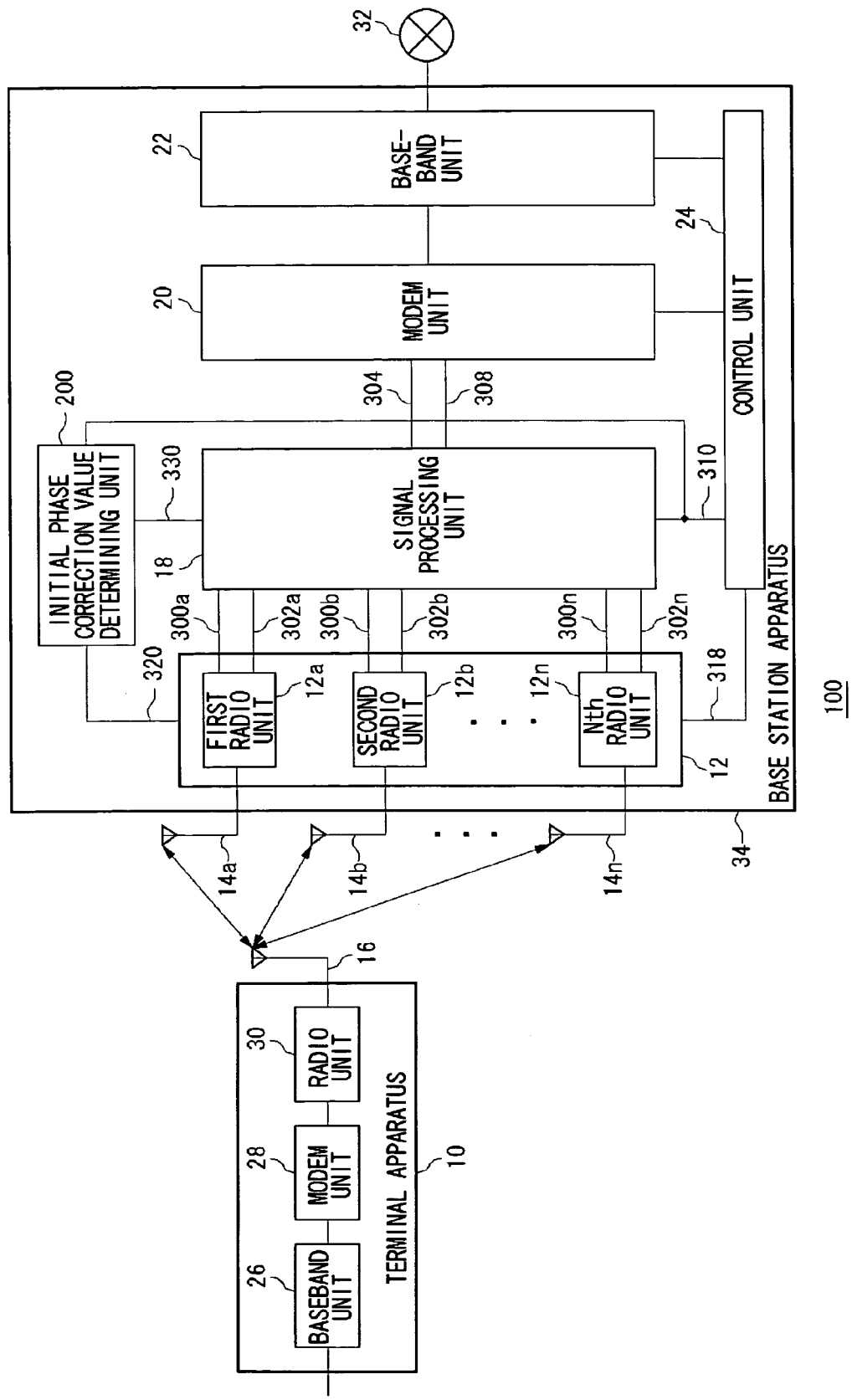
FIG. 1 shows a structure of a communication system according to a first embodiment of the present invention.

The invention will now be described based on the following embodiments which do not intend to limit the scope of the present invention but exemplify the invention. All of the features and the combinations thereof described in the embodiments are not necessarily essential to the invention.

First Embodiment

Before describing specific modes of invention, a general description of the present invention will be given hereinbelow. A first embodiment according to the present invention relates to a base station apparatus, to which terminal apparatuses can be connected, such as a base station apparatus used in the wireless LAN (Local Area Network). A base station apparatus according to the present embodiments is provided with a plurality of antennas and also provided with a plurality of quadrature detectors and a plurality of quadrature modulators. The quadrature detector and the quadrature modulator have each a phase shifter whose phase is indefinite at the time of power-on. The base station apparatus according to the present embodiments corrects phase errors of the quadrature detector and the quadrature modulator. Signals are transmitted from one of the plurality of antennas (hereinafter this antenna as well as a transmitting/receiving apparatus connected to this antenna will be referred to as "antenna for measurement" or "measuring antenna") and the signals are received by at least two antennas (hereinafter these antennas as well as a transmitting/receiving apparatus connected to these antenna will be referred to as "antenna for reference" (or "reference antenna") and "antenna for correction" (or "correcting antenna"). Specifically, the "antenna for correction" (or correcting antenna) is one used to receive and transmit signals on which a correction processing is to be performed. Based on signals received by the antenna for reference and the antenna for correction, the base station apparatus computes a plurality of weighting factors corresponding thereto (hereinafter referred to as "receiving weight vectors").

The thus computed receiving weight vectors are set to the identical value for transmission (hereinafter, the weighting factors therefor will be referred to as "transmission weight vectors"). The rotation amounts of phase correction values for the reference antenna and the correcting antenna (hereinafter referred to as "initial phase correction values") are respectively set to 0 temporarily. In this state, signals are transmitted from the reference antenna and the correcting antenna and are then received by a measuring antenna so as to measure the received power thereof (hereinafter referred to as "signal level 1"). Next, the rotation amount of an initial phase correction value for the correcting antenna is set to π temporarily, and the above-described operation is carried out so as to measure the received power (hereinafter referred to as "signal level 2"). The signal level 1 and the signal level 2 are compared in such a manner that the rotation amount corresponding to larger signal level is determined to be the initial phase correcting value for the correcting antenna. In what is to follow, the roles of measuring antenna, reference antenna and correcting antenna are switched among a plurality of antenna so as to respectively determine the rotation amounts of initial phase correction values for the plurality of antennas. If the rotation amounts of initial phase correction values have already been determined, then the processing will be carried out with such a fixed rotation amount.

FIG. 1 shows a structure of a communication system 100 according to a first embodiment of the present invention. The communication system 100 includes a terminal apparatus 10, a base station apparatus 34 and a network 32. The terminal apparatus 10 includes a baseband unit 26, a modem unit 28, a radio unit 30 and an antenna 16 for use with terminal apparatus. The base station apparatus 34 includes a first basestation antenna 14a, a second basestation antenna 14b, . . . and an Nth basestation antenna 14n, which are generically referred to as basestation antennas 14, a first radio unit 12a, a second radio unit 12b, . . . and an Nth radio unit 12n, which are generically referred to as a radio unit 12, a signal processing unit 18, a modem unit 20, a baseband unit 22, a control unit 24 and an initial phase correction value determining unit 200. Moreover, the base station apparatus 34 includes, as signals, a first digital received signal 300a, a second digital received signal 300b, . . . and an Nth digital received signal 300n, which are generically referred to as digital received signals 300, a first digital transmission signal 302a, a second digital transmission signal 302b, . . . and an Nth digital transmission signal 302n, which are generically referred to as digital transmission signals 302, a composite signal 304, a pre-separation signal 308, a signal processor control signal 310, a radio unit control signal 318, a power-measuring received signal 320 and an initial phase correction value signal 330.

The baseband unit 22 in the base station apparatus 34 is an interface with the network 32 whereas the baseband unit 26 in the terminal apparatus 10 is an interface with a PC connected to a terminal apparatus 10 or applications inside the terminal apparatus 10. The baseband unit 22 and the baseband unit 26 perform respectively transmission/receiving processings on information signals to be transmitted in the communication system 100. Error correction or automatic retransmission processing may also be carried out, but the description of such processings is omitted here.

The modem unit 20 in the base station apparatus 34 and the modem unit 28 in the terminal apparatus 10 carry out a modulation processing in which transmission signals are generated by modulating carrier with information signals to be transmitted. In the present embodiment, assumed as modulation methods are BPSK (Binary Phase Shift Keying) and QPSK (Quadrature Phase Shift Keying). The modem units 20 and 28 also carry out a demodulation processing in which the transmitted information signals are reproduced by demodulating the received signals.

The signal processing unit 18 performs a signal processing necessary for a transmission/receiving processing of adaptive array antennas. Furthermore, the signal processing unit 18 performs not only a signal processing for communication with the terminal apparatus 10 but also a signal processing necessary for determining phase errors in quadrature modulation and quadrature detection to be done by the radio unit 12, namely, for determining a rotation amount of an initial phase correction value.

The radio unit 12 in the base station apparatus 34 and the radio unit 30 in the terminal apparatus 10 carry out frequency conversion processing between the baseband signals and radio frequency signals, which are processed by the signal processing unit 18, the modem unit 20, the baseband unit 22, the baseband unit 26 and the modem unit 28, amplification processing, quadrature modulation processing, quadarture detection processing, A-D or D-A conversion processing and the like.

The basestation antennas 14 in the base station 34 and the terminal antenna 16 in the terminal apparatus 10 perform transmission/receiving processings for signals of radio frequencies. The directivity of the antennas may be arbitrary and the number of basestation antennas 14 is denoted by N.

The control unit 24 controls timings for the radio unit 12, the signal processing unit 18, the modem unit 20 and the baseband unit 22, or channel allocation.

The initial phase correction value determining unit 200 determines rotation amounts of initial phase correction values, based on the power-measuring received signals 320 inputted from the radio unit 12, and outputs to the signal processing unit 18 as initial phase correction value signals 330. The timing for determining the rotation amount of initial phase correction values is controlled by the signal processor control signal 310.

In terms of hardware, the above-described structure can be realized by a CPU, a memory and other LSIs of an arbitrary computer. In terms of software, it is realized by memory-loaded programs having reserve-manage functions or the like, but drawn and described herein are function blocks that are realized in cooperation with those. Thus, it is understood by those skilled in the art that these function blocks can be realized in a variety of forms by hardware only, software only or the combination thereof.

Figure 2:
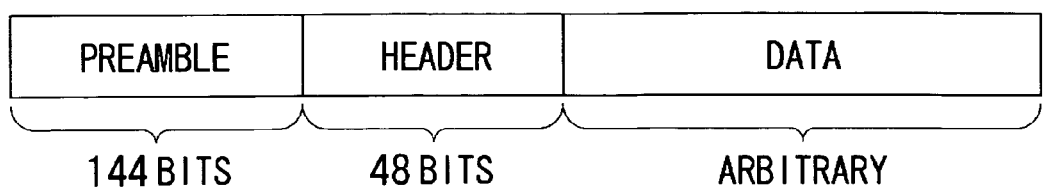
FIG. 2 shows a burst format according to the first embodiment of the present invention.

FIG. 2 shows a burst format according to the first embodiment. This format is a burst format used in IEEE802.11b, which is one of standards for CSMA(Carrier Sense Multiple Access)-based wireless LAN (Local Area Network). A preamble is placed in the first 144 bits of the burst, and a header is placed in the subsequent 48 bits thereof. The preamble, which is known to the terminal apparatus 10 or the base station apparatus 34, can also be used as a training signal which will be described later.

Figure 3:
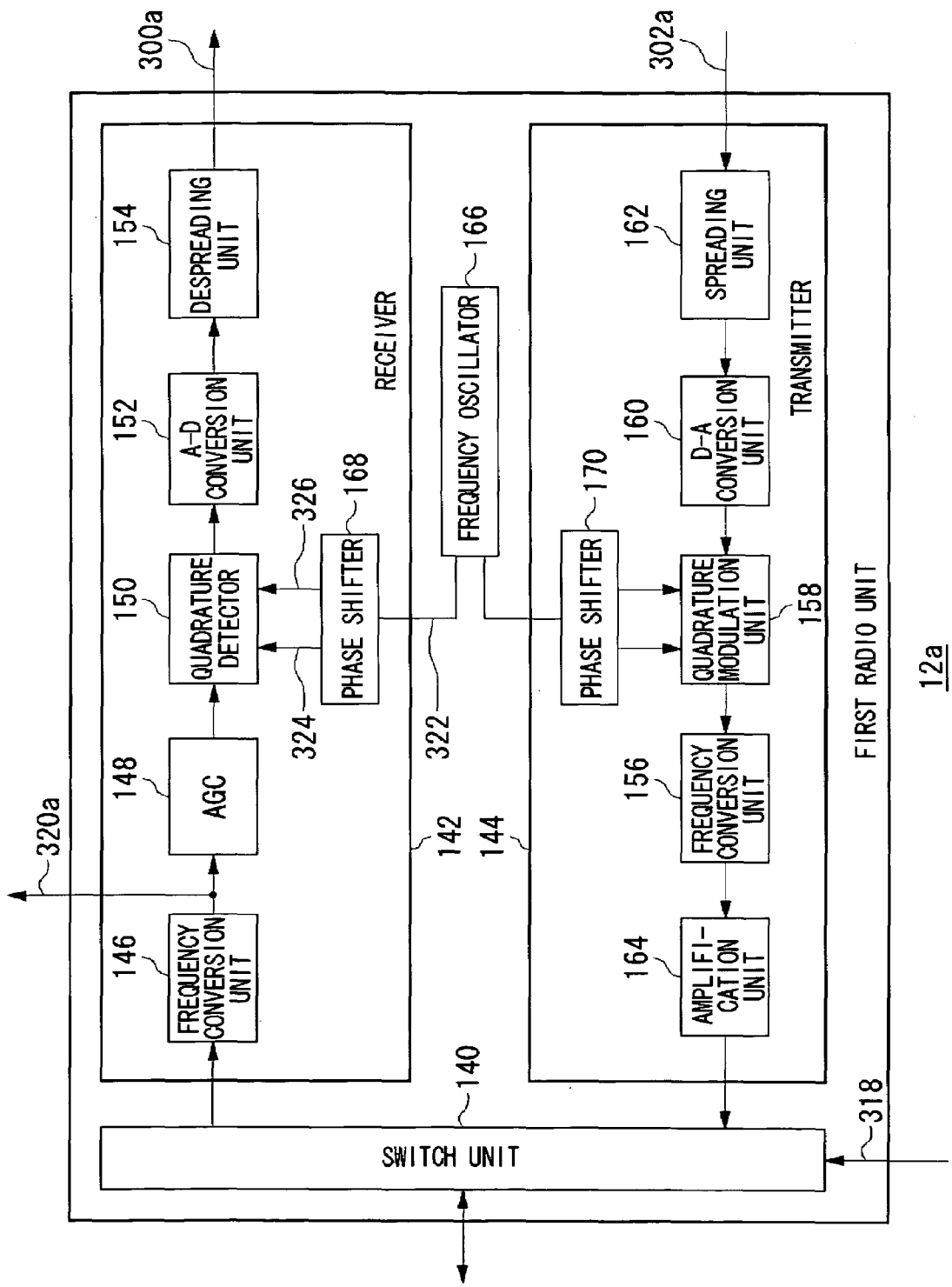
FIG. 3 shows a structure of a first radio unit shown in FIG. 1.

FIG. 3 shows a structure of a first radio unit 12a. The first radio unit 12a includes a switch unit 140, a receiver 142, a transmitter 144 and a frequency oscillator 166. The receiver 142 includes a frequency conversion unit 146, an AGC (Automatic Gain Control) 148, an quadrature detector 150, an A-D conversion unit 152, an despreading unit 154 and a phase shifter 168. The transmitter 144 includes an amplification unit 164, a frequency conversion unit 156, an quadrature modulation unit 158, a D-A conversion unit 160, a spreading unit 162 and a phase shifter 170. Signals involved in the first radio unit 12a include a first power-measuring received signal 320a, which is also generically referred to as a power-measuring received signal 320, a local signal 322 an in-phase signal 324 and a quadrature-phase signal 326.

The switch unit 140 switches input and output of signals to the receiver 142 and the transmitter 144 according to radio control signals 318 from the control unit 24 (not shown in FIG. 3). That is, the switch unit 140 selects the signals from the transmitter 144 at the time of transmission whereas it selects the signals to the receiver 142 at the time of receiving.

The frequency conversion unit 146 in the receiver 142 and the frequency conversion unit 156 in the transmitter 144 perform frequency conversion on targeted signals between radio frequencies and intermediate frequencies. The frequency conversion unit 146 outputs externally the first power-measuring received signal 320a.

The AGC 148 controls gain automatically to make the amplitude of the received signals an amplitude within the dynamic range of the A-D conversion unit 152.

The quadrature detector 150 generates baseband analog signals by performing quadrature detection on intermediate frequency signals. On the other hand, the quadrature modulation unit 158 generates intermediate frequency signals by performing quadrature modulation on the baseband analog signals.

The frequency oscillator 166 supplies a signal having a predetermined frequency with which to perform quadrature detection and quadrature modulation. As shown in FIG. 1 and FIG. 3, a single radio unit 12 is provided with a single frequency oscillator 166, so that a plurality of radio units 12 are respectively provided with a plurality of frequency oscillators 166.

The phase shifter 168 inputs local signals 322 and then generates in-phase signal 324 which has the same phase as the local signal 322 and a quadrature-phase signal 326 which has a phase quadrature to that of the local signal 322, and outputs the thus generated in-phase signal 324 and quadrature-phase signal 326 to the quadrature detector 150. The phase value of the quadrature-phase signal 326 at the time of power-on, relative to the in-phase signal 324, is indeterminate, so that the quadrature-phase signal 326 will have a phase of plus or minus $\pi/2$ against the in-phase signal 324. The phase shifter 170 operates the same way as the phase shifter 168. Since the phase value of the phase shifter 168 and that of the phase shifter 170 are separate from each other, the phase values of the phase shifter 168 and phase shifter 170 may be identical or different.

The A-D conversion unit 152 converts baseband analog signals into digital signals, and the D-A conversion unit 160 converts baseband digital signals into analog signals.

The despreading unit 154 performs a despread processing on baseband digital signals by a spreading code sequence. Here, the despread-processed baseband digital signal which is outputted from the despreading unit 154 is called a first digital received signal 300a. It is to be noted that this despread processing may be replaced by a Walsh transform and in such a case the base station apparatus 34 can be communicated by CCK (Complementary Code Keying) modulation.

The spreading unit 162 performs a spread processing on baseband digital signals by a spreading code sequence. Here, a baseband digital signal, which will be inputted to the spreading unit 162 and subjected to the spread, is called a first digital transmission signal 302a.

The amplification unit 164 amplifies radio frequency signals to be transmitted.

Figure 4:
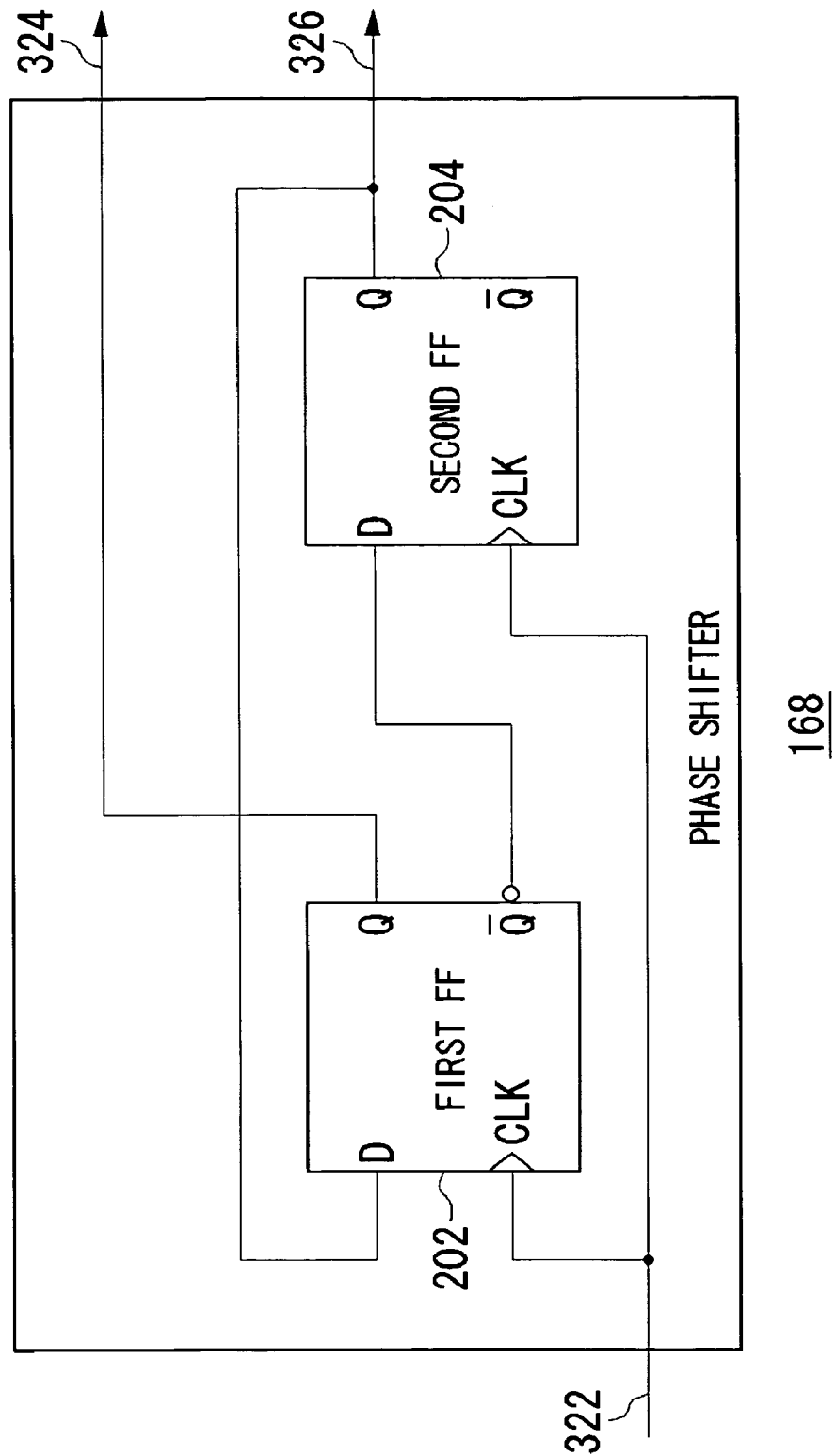
FIG. 4 shows a structure of a phase shifter shown in FIG. 3.

FIG. 4 shows a structure of a phase shifter 168. The phase shifter 168 includes a first FF (flip-flop) 202 and a second FF (flip-flop) 204.

The first FF 202 and the second FF 204 input the local signals 322 in their respective CLK inputs. An inverted Q output outputs the inverted signal of a Q output whereas a D output outputs a signal whose phase differs from that of Q output signal. As shown in FIG. 4, an in-phase signal 324 is outputted from the Q output of the first FF 202 whereas a quadrature-phase signal 326 is outputted from the Q output of the second FF 204.

Figure 5A:
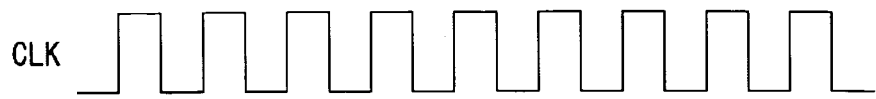
FIGS. 5A to 5E show signal waveforms of the phase shifter shown FIG. 4.
Figure 5B:
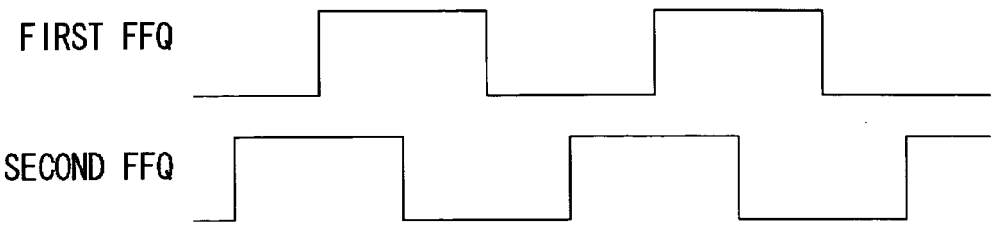
Figure 5C:
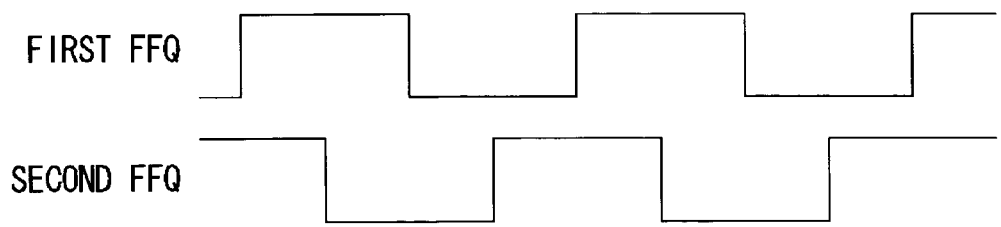
Figure 5D:
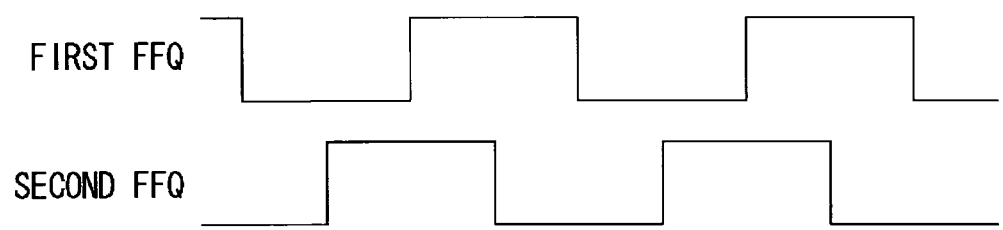
Figure 5E:
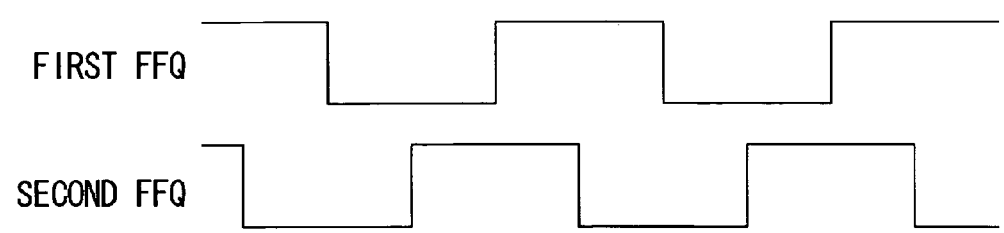

FIGS. 5A to 5E show signal waveforms for a phase shifter 168. FIG. 5A shows an in-phase signal 324 inputted to CLK. FIG. 5B and FIG. 5E each show Q output of first FF 202 and Q output of second FF 204 when the phase of first FF 202 differs from that of second FF 204, namely, in-phase signal 324 and quadrature-phase signal 326. In FIG. 5B and FIG.

5D, the phase of quadrature-phase signal 326 against the in-phase signal 324 is $-\pi/2$ whereas in FIG. 5E and FIG. 5D, the phase of quadrature-phase signal 326 against the in-phase signal 324 is $+\pi/2$. If the phases as mentioned above are considered between the phase shifter 168 and the phase shifter 170, then the case will be either when the phase is in agreement or when the phase is shifted by $\pi$.

Figure 6:
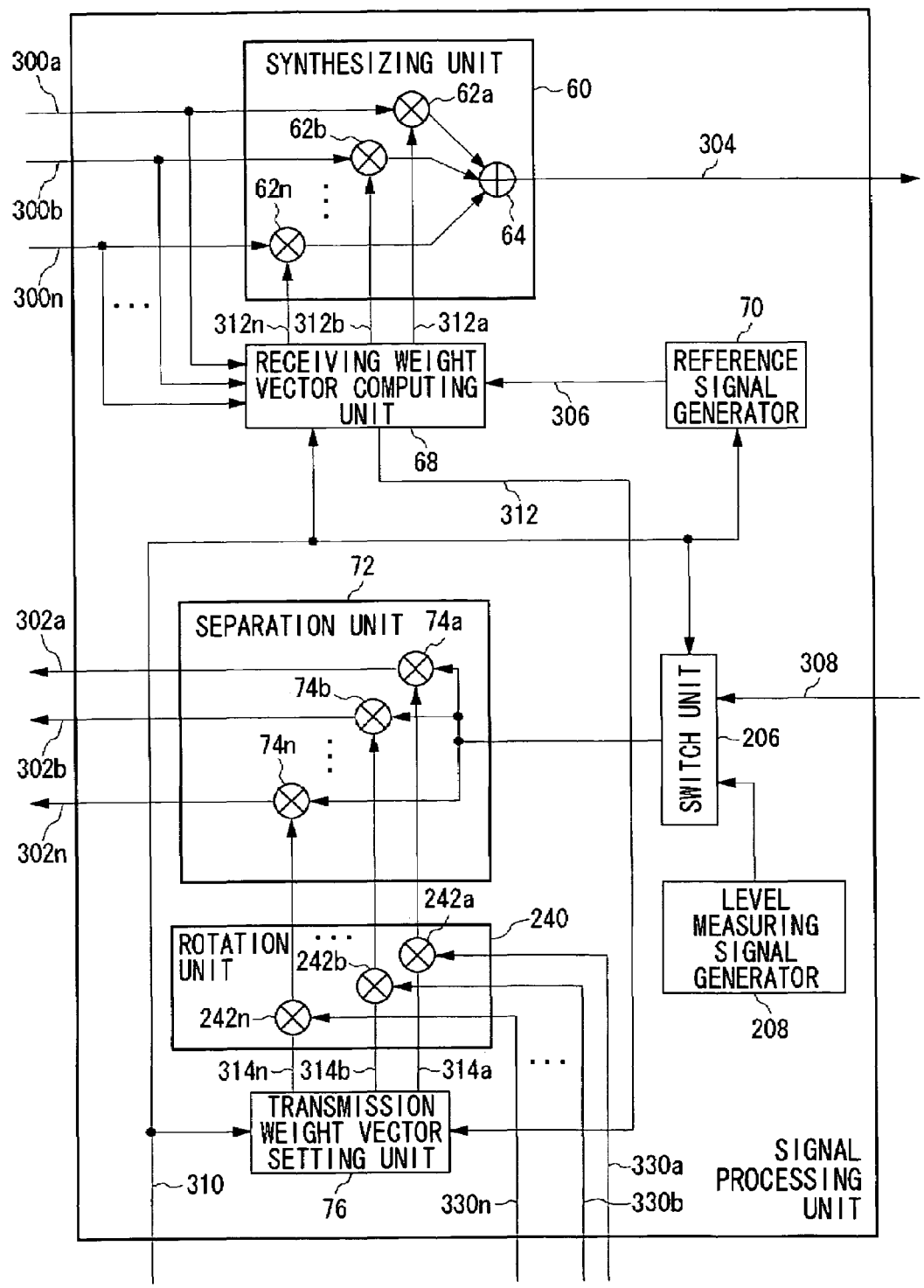
FIG. 6 shows a structure of a signal processing unit shown in FIG. 1.

FIG. 6 shows a structure of a signal processing unit 18. The signal processing unit 18 includes a synthesizing unit 60, a receiving weight vector computing unit 68, a reference signal generator 70, a separation unit 72, a transmission weight vector setting unit 76, a switch unit 206, a level measuring signal generator 208 and a rotation unit 240. The synthesizing unit 60 includes a first multiplier 62a, a second multiplier 62b, . . . and an Nth multiplier 62n, which are generically named multipliers 62, and an adder 64. The separation unit 72 includes a first multiplier 74a, a second multiplier 74b, . . . and an Nth multiplier 74n, which are generically named multipliers 74. The rotation unit 240 includes a first multiplier 242a, a second multiplier 242b, . . . and an Nth multiplier 242n, which are generically named multipliers 242.

Referring to FIG. 6, signals involved in the signal processing unit 18 include a reference signal 306, a first receiving weight vector signal 312a, a second receiving weight vector signal 312b, . . . and an Nth receiving weight vector signal 312n, which are generically referred to as receiving weight vector signals 312, a first transmission weight vector signal 314a, a second transmission weight vector signal 314b, . . . and an Nth transmission weight vector signal 314n, which are generically referred to as transmission weight vector signals 314.

The synthesizing unit 60 weights digital received signals 300 with receiving weight vector signals 312 in the multipliers 62, then adds the thus weighted signals in the adder 64 and outputs a composite signal 304.

The reference signal generator 70 outputs as a reference signal a known signal training signal stored beforehand during a training signal period.

Over a training signal period of time the receiving weight vector computing unit 68 computes receiving weight vector signals 312 necessary for weighting the digital received signals 300 from the digital received signals 300 and the reference signal 306, through a correlation processing. Here, a baseband signal (300) $x_i(t)$ received by the ith antenna is expressed by Equation (1).

$$x_i(t)=h_i S(t)+n_i(t) \tag{1}$$

where $h_i$ is a response characteristic of wireless propagation path, S(t) a transmission signal and $n_i(t)$ a noise.

Since the reference signal 306 to correspond to S(t), the correlation between the baseband signal (300) $x_i(t)$ received by the ith antenna and S(t) is computed using Equation (2).

$$\Sigma x_i{}^*S(t)=h_i{}^*\Sigma S^*(t)S(t)+\Sigma n_i{}^*S(t)\approx h_i{}^*=w_i \tag{2}$$

Here, it is assumed that the average time is sufficiently long, and any term relating to the noise is ignored. As a result, $w_i$ is obtained as the receiving weight vector signal 312.

The transmission weight vector setting unit 76 sets transmission weight vector signals 314 necessary for weighting a pre-separation signal 308, based on receiving weight vector signals 312. For the sake of brevity as well as in order to estimate the rotation amount of initial phase correction values, the receiving weight vector signal 312 and the transmission weight vector signal 314 are assumed identical.

In the multipliers 242, a transmission weight vector signal 314 is rotated by an initial phase correction value signal 330 with which to correct 0 or $\pi$ corresponding to the errors in phases between the phase shifter 168 and the phase shifter 170. As a result of this rotation, the beam pattern of a signal to be transmitted is made to become identical to that of a received signal by the transmission weight vector signal 314 outputted from the multiplier 242 in a communication with the terminal apparatus 10. At the stage where the rotation amount of an initial phase correction value is to be determined, on the other hand, the only multipliers 242 that correspond to an antenna for reference and an antenna for processing are operated based on the initial phase correction value signals 330. Specifically, the "antenna for processing" is one used to receive and transmit signals on which a processing is to be performed.

The separation unit 72 weights a separation signal 308 with a transmission weight vector signal 314 to which a phase rotation is added in the multipliers 74, and outputs digital transmission signals 302.

In order that signals may be outputted from an antenna, among the basestation antennas 14, that corresponds to the antenna for measurement, the switch unit 206 outputs to the multipliers 74 the signals outputted from the level measuring signal generator 208 in a case when the rotation amount of initial phase correction values is to be detected. It is to be noted that signals outputted from the switch unit 206 will be called pre-separation signals 308, which also include a pre-separation signal 308 inputted from the modem unit 20 and signals outputted from the level measuring signal generator 208.

Figure 7:
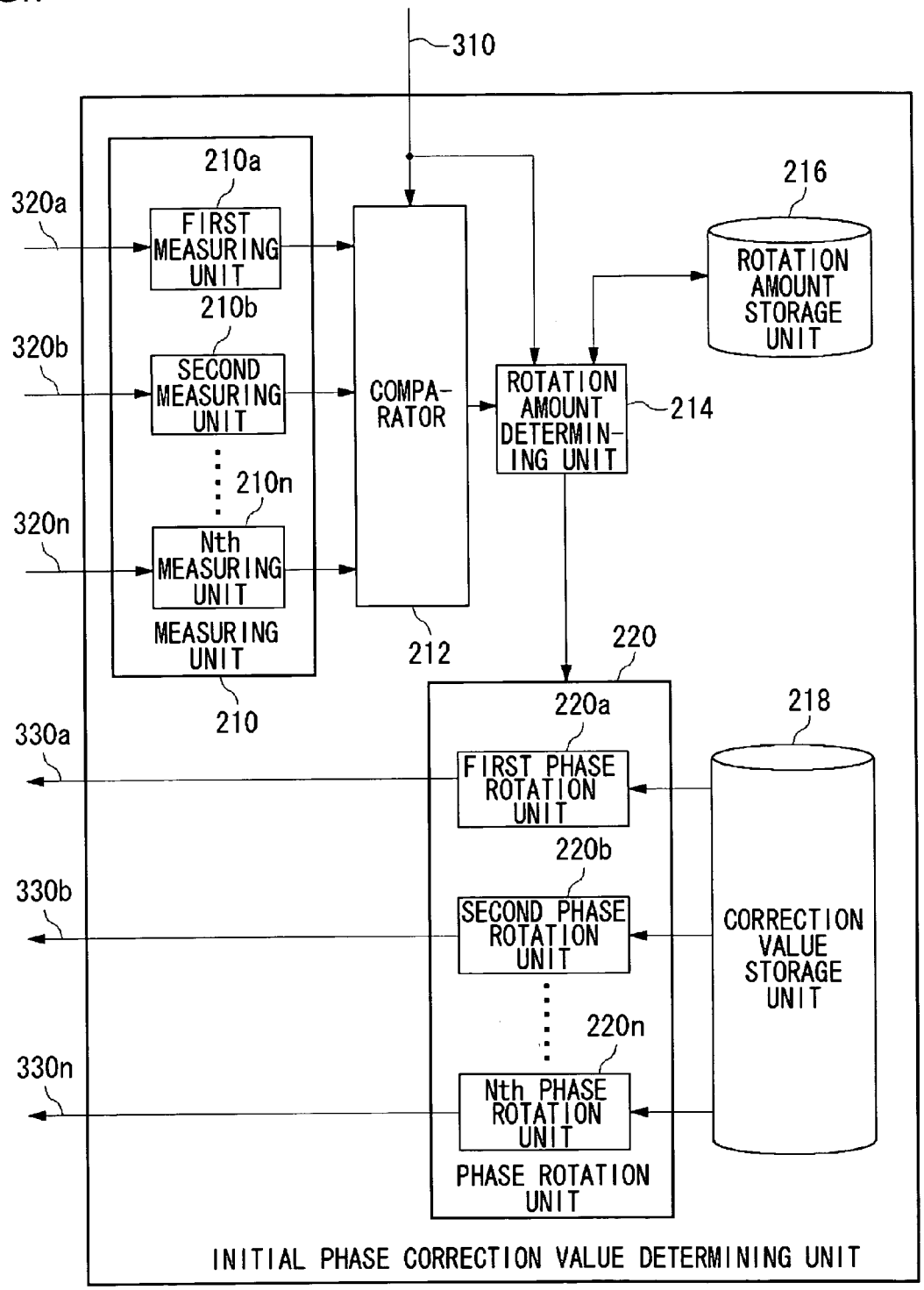
FIG. 7 shows a structure of an initial phase correction value determining unit shown in FIG. 1.

FIG. 7 illustrates a structure of an initial phase correction value determining unit 200. The initial phase correction value determining unit 200 includes a first measuring unit 210a, a second measuring unit 210b, . . . and an Nth measuring unit 210n, which are generically referred to as measuring units 210, a comparator 212, a rotation amount determining unit 214, a rotation amount storage unit 216, a correction value storage unit 218, and a first phase rotation unit 220a, a second phase rotation unit 220b, . . . and an Nth phase rotation unit 220n, which are generically referred to as phase rotation units 220.

The correction value storage unit 218 stores initial phase correction values corresponding respectively to a plurality of basestation antennas 14. It is to be noted that these initial phase correction values are ones corresponding to the phase rotation amount of "0", where the phases are in agreement between a phase shifter 168 and a phase shifter 170. Here, the initial phase correction values correspond to the amounts of calibration of a transmitting system and are measured beforehand.

The phase rotation units 220 cause a phase rotation of 0 or $\pi$ to the initial phase correction values stored in the correction value storage unit 218 in response to instructions from the rotation amount determining unit 214. From the measurement of signal level 1 to the measurement of signal level 2 at the measuring units 210, a phase rotation unit 220 corresponding to a reference antenna causes a phase rotation in the correction value storage unit 218 by the previously determined amount of phase rotation. To start the processing, the phase rotation amount of the phase rotation unit 220 corresponding to the reference antenna shall be set to 0. For the measurement of signal level 1, the phase rotation amount of the phase rotation units 220 corresponding to the antennas for processing is temporarily set to 0. And for the measurement of signal level 2, the phase rotation amount of the phase rotation units 220 corresponding to the antennas for processing is temporarily set to π. The phase rotation units 220 output initial phase correction value signals 330.

The measuring units 210 measure the electric powers of power-measuring received signals 320. Though the measuring method is arbitrary, it is the measuring units 210 connected to basestation antennas 14 corresponding to measuring antennas that measure the electric powers. As described above, the measurement results of the separate timings are outputted to the comparator 212 as signal level 1 and signal level 2.

The comparator 212 compares signal level 1 and signal level 2 outputted from the measuring units 210 and selects one with a larger value. When signal level 1 has been selected, the rotation amount determining unit 214 selects "0" for the phase rotation amount of the phase rotation units 220 corresponding to the antennas for processing. Or when signal level 2 has been selected, the rotation amount determining unit 214 selects "π" for the phase rotation amount of the phase rotation units 220 corresponding to the antennas for processing. When signal level 1 is measured, the rotation amount determining unit 214 temporarily sets "0" for the phase rotation amount of the phase rotation units 220 corresponding to the antennas for processing. Or when signal level 2 is measured, the rotation amount determining unit 214 temporarily sets "π" for the phase rotation amount of the phase rotation units 220 corresponding to the antennas for processing.

The rotation amount storage unit 216 stores the phase rotation amount determined by the rotation amount determining unit 214 for each initial phase correction value determining unit 200. The phase rotation amount for each initial phase correction value determining unit 200 stored in the rotation amount storage 216 is used when communicating with a terminal apparatus 10.

Figure 8:
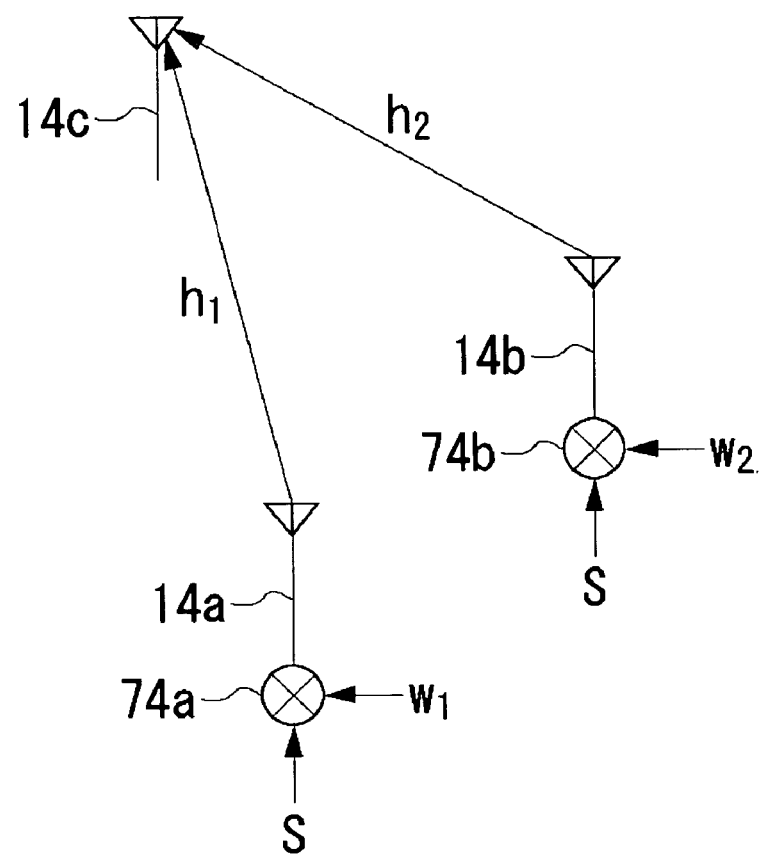
FIG. 8 illustrates a concept of a method for calibration of a communication system shown in FIG. 1.

FIG. 8 illustrates a concept of a calibration method. It is assumed here that a first basestation antenna 14a is an antenna for processing, a second basestation antenna 14b is an antenna for reference, and a third basestation antenna 14c is an antenna for measurement. Also, $h_1$ is response characteristics between the first basestation antenna 14a and the third basestation antenna 14c; $h_2$ is response characteristics between the second basestation antenna 14b and the third basestation antenna 14c; $w_1$ is a first transmission weight vector signal 314a after a phase rotation by a first multiplier 242a; $w_2$ is a second transmission weight vector signal 314b after a phase rotation by a second multiplier 242b; and S is a transmission signal. It is to be assumed here that the first transmission weight vector signal 314a and the second transmission weight vector signal 314b are determined by a signal previously transmitted from the third basestation antenna 14c. A received signal r at the third basestation antenna 14c is expressed by Equation (3) below.

$$r=(w_1 h_1+w_2 h_2)S \quad (3)$$

Here, if the phase value of a signal transmitted from the first basestation antenna 14a, which is an antenna for processing, is in agreement with the phase value of the phase shifter 168, then the received signal r will be a predetermined value. On the other hand, if the phase value of a signal transmitted from the first basestation antenna 14a, which is an antenna for processing, is deviated by π from the phase value of the phase shifter 168, then the received signal r will be smaller. As a result, a rotation amount of the initial phase correction value to be set can be determined eventually by temporarily setting 0 or π as the rotation amount of the initial phase correction value corresponding to the antenna for processing and comparing the electric powers of the signals received by the antenna for measurement for the 0 and π settings.

Figure 9:
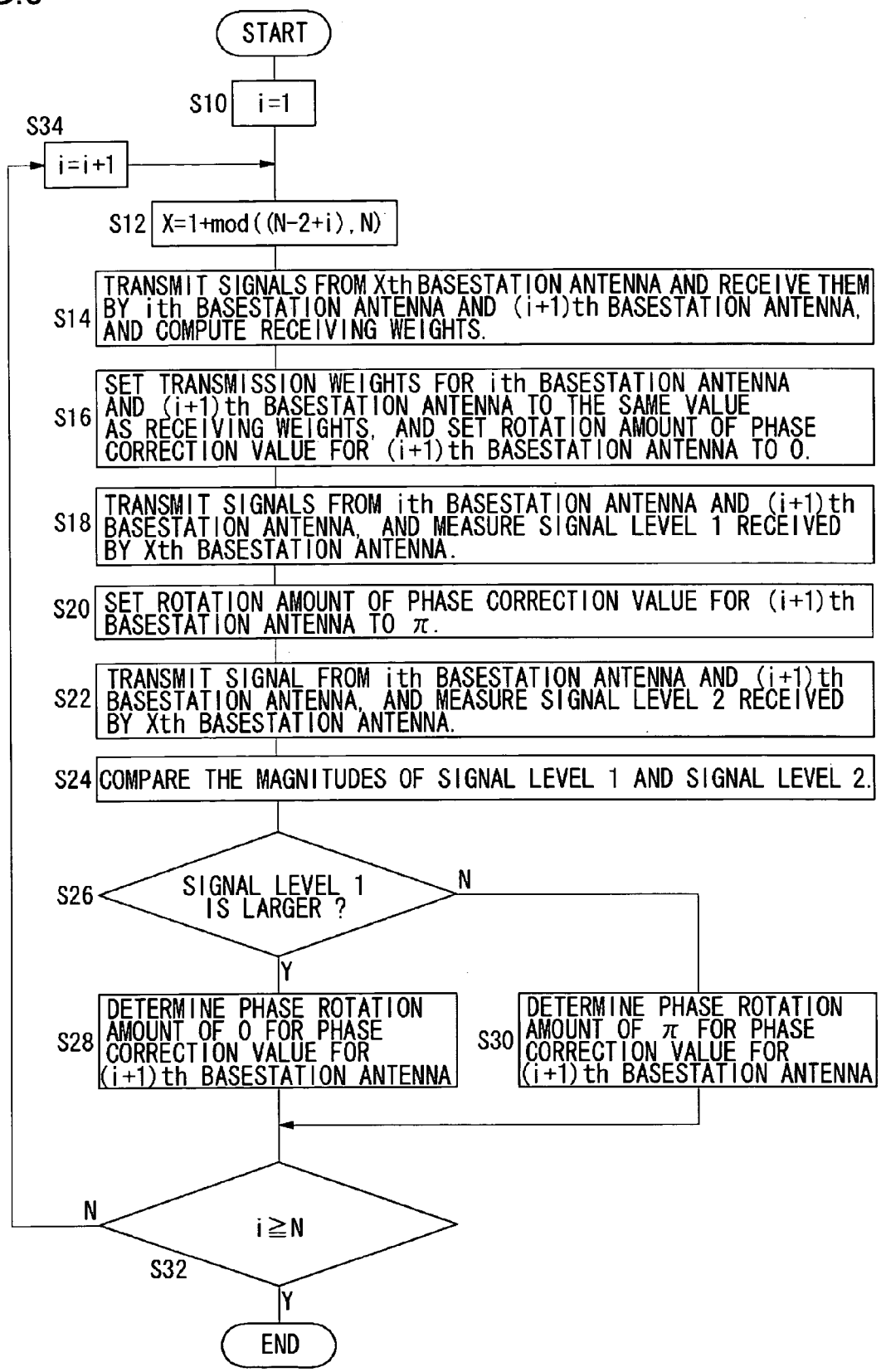
FIG. 9 is a flowchart showing the steps for determining a correction value in FIG. 1.

FIG. 9 is a flowchart showing the steps for determining a correction value. A control unit 24 sets 1 as the number i of a basestation antenna 14 for setting an antenna for reference (S10). Now a basestation antenna 14 for setting an antenna for measurement is set for X, which is as described in Equation (4) below (S12).

$$X=1+\mathrm{mod}((N-2+i),N) \quad (4)$$

A signal is transmitted from an Xth basestation antenna 14x, the signal is received by an ith basestation antenna 14i and an (i+1) th basestation antenna 14(i+1), and a receiving weight vector computing unit 68 computes receiving weight vector signals 312 corresponding respectively thereto (S14). A transmission weight vector setting unit 76 sets the transmission weight vector signal 314 for the ith basestation antenna 14i and the (i+1)th basestation antenna 14(i+1) to the same value as the receiving weight vector signal 312, and a rotation amount determining unit 214 sets 0 for the phase rotation amount of the initial phase correction value for the (i+1)th basestation antenna 14(i+1) (S16).

On the other hand, the phase rotation amount of the initial phase correction value for the ith basestation antenna 14i is to be a predetermined value. Note that the predetermined value is to be 0 when i is 1. Signals are transmitted from the ith basestation antenna 14i and the (i+1)th basestation antenna 14(i+1), and a measuring unit 210 measures signal level 1 for the signals received by the Xth basestation antenna 14x (S18). The rotation amount determining unit 214 sets π for the phase rotation amount of the initial phase correction value for the (i+1)th basestation antenna 14(i+1) (S20). Signals are transmitted from the ith basestation antenna 14i and the (i+1)th basestation antenna 14(i+1), and a measuring unit 210 measures signal level 2 for the signals received by the Xth basestation antenna 14x (S22). A comparator 212 compares the magnitudes of signal level 1 and signal level 2 (S24). If the magnitude of signal level 1 is larger (Y of S26), the rotation amount determining unit 214 selects the phase rotation amount of 0 for the initial phase correction value for the (i+1)th basestation antenna 14(i+1) (S28).

On the other hand, if the magnitude of signal level 1 is not larger (N of S26), the rotation amount determining unit 214 selects the phase rotation amount of π for the initial phase correction value for the (i+1)th basestation antenna 14(i+1) (S30). A rotation amount storage unit 216 stores a thus determined phase rotation amount. If i is not N or above (N of S32), a control uhit 24 adds 1 to i (S34) and repeats the same operation. On the other hand, if i is N or above (Y of S32), the control unit 24 repeats the same operation. When a communication is carried out, the initial phase correction value stored in the correction value storage unit 218 is first rotated by a phase rotation unit 220 based on the phase rotation amount stored in the rotation amount storage unit 216 and then an initial phase correction value signal 330 is outputted.

Figure 10:
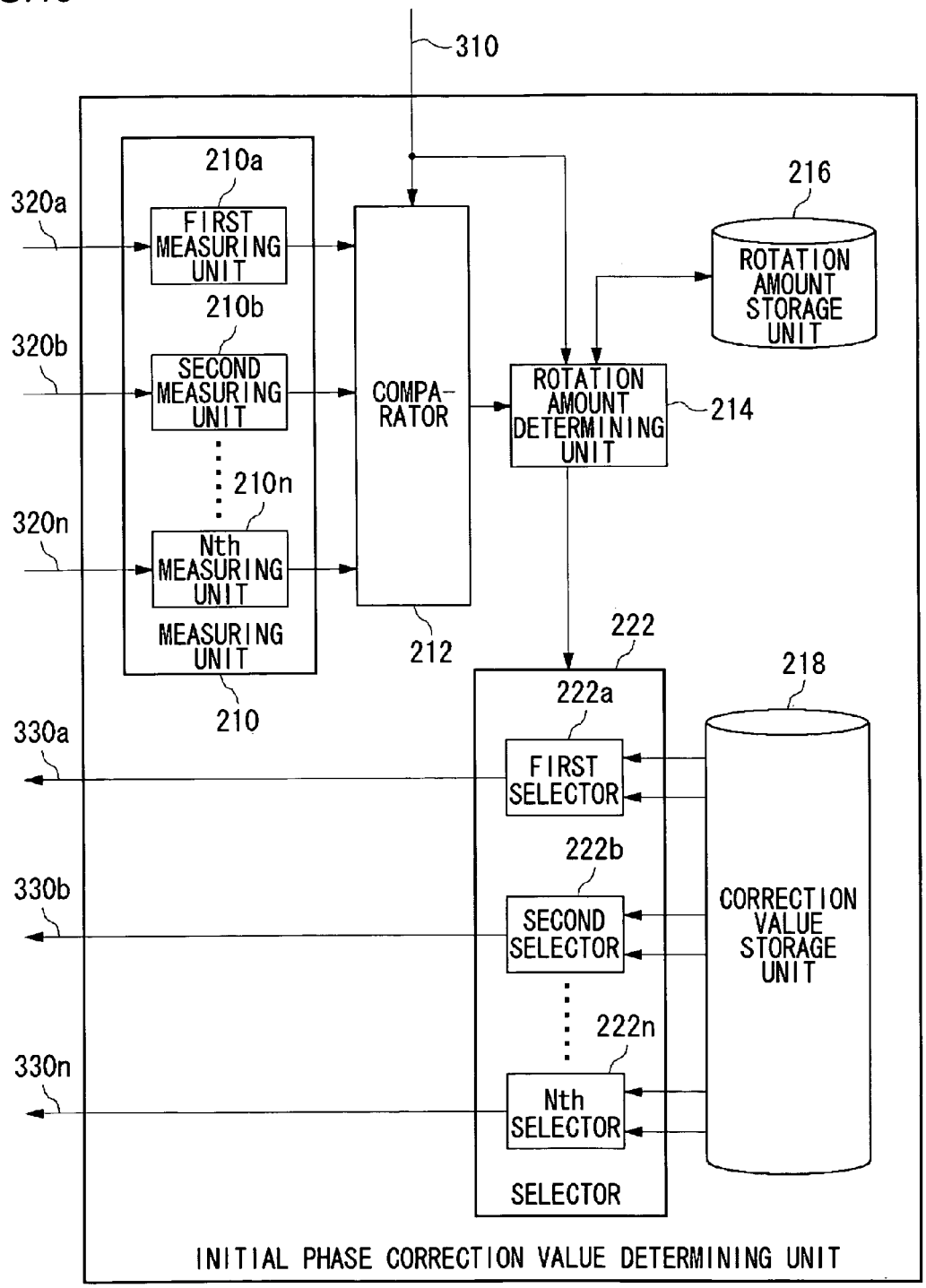
FIG. 10 illustrates another structure of an initial phase correction value determining unit shown in FIG. 1.

FIG. 10 illustrates another structure of an initial phase correction value determining unit 200. The initial phase correction value determining unit 200, similar to the initial phase correction value determining unit 200 of FIG. 7, includes a first measuring unit 210a, a second measuring unit 210b, . . . and an Nth measuring unit 210N, which are generically referred to as measuring units 210, a comparator 212, a rotation amount determining unit 214, a rotation amount storage unit 216, and a correction value storage unit 218. Different from the initial phase correction value determining unit 200 of FIG. 7, however, it includes a first selector 222a, a second selector 222b, . . . and an Nth selector 222n, which are generically referred to as selectors 222.

The correction value storage unit 218, similar to the correction value storage unit 218 in FIG. 7, stores initial phase correction values corresponding respectively to a plurality of basestation antennas 14. However, the correction value storage unit 218 differs from the correction value storage unit 218 of FIG. 7 in that it stores both the initial phase correction values corresponding to the phase rotation amount of 0, where the phases are in agreement between the phase shifter 168 and the phase shifter 170, and the initial phase correction values corresponding to the phase rotation amount of $\pi$, where the phases are inverted between the phase shifter 168 and the phase shifter 170.

The selectors 222 select the initial phase correction values stored in the correction value storage unit 218 according to the phase rotation amounts determined or temporarily set by the rotation amount determining unit 214.

According to the first embodiment of the present invention, the phase errors of phase shifters provided separately for quadrature detection and quadrature modulation can be corrected, and transmission beam control by transmission weight vectors can be carried out correctly. Since the orthogonality between the response characteristics of a transmission path and wrong transmission weight vectors are used in the determination of the phases of transmitted signals, it is possible to estimate the phases without adjusting the path length of the signals. Moreover, this embodiment permits estimation of phase errors within a single base station equipment, thus eliminating the need for any additional measuring equipment.

Second Embodiment

Similar to the first embodiment, a second embodiment of the present invention relates to a base station apparatus for correcting errors in initial phases between an quadrature detector and an quadrature modulator. In this second embodiment, an antenna for measurement is provided for exclusive use separately from an antenna used in communication. A signal generator and a measuring unit for level measurement are also connected to the antenna for measurement.

Figure 11:
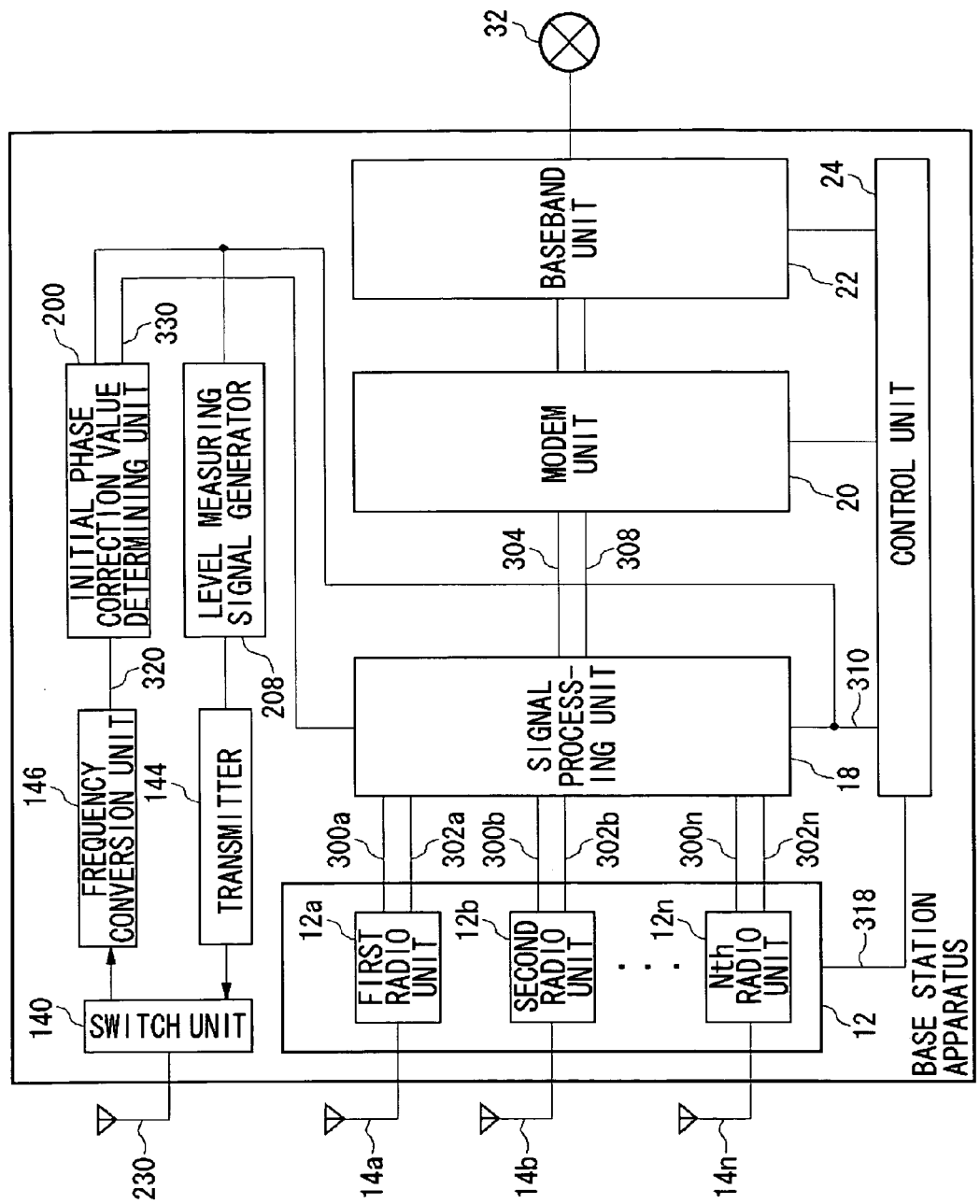
FIG. 11 illustrates a structure of a base station apparatus according to a second embodiment of the present invention.

FIG. 11 illustrates a structure of a base station apparatus 34 according to the second embodiment. The base station apparatus 34 includes, similar to the base station apparatus of FIG. 1, basestation antennas 14, radio units 12, a signal processing unit 18, a modem unit 20, a baseband unit 22, a control unit 24 and an initial phase correction value determining unit 200, and includes, different form the base station apparatus of FIG. 1, a measuring antenna 230, a switch unit 140, a frequency conversion unit 146, a transmitter 144 and a level measuring signal generator 208.

The measuring antenna 230 is not used for communication but is used for the processing to detect the rotation amounts for the initial phase correction values. Connected to the measuring antenna 230 are the switch unit 140, the frequency conversion unit 146, the initial phase correction value determining unit 200, the transmitter 144 and the level measuring signal generator 208, and these functions are the same as described in the first embodiment. It is to be noted, however, that only one measuring unit 210 is included in the initial phase correction value determining unit 200.

According to the second embodiment, a measuring antenna is provided separately from the antennas used in communication and used for signal transmission between the antennas only, so that even an amplifier capable of outputting small-power signals can be put to this application. Also, the use of an exclusive function for the measuring antenna reduces the switching of signal lines and makes the apparatus structure simpler.

The present invention has been described based on the embodiments which are only exemplary. It is therefore understood by those skilled in the art that there exist other various modifications to the combination of each component and process described above and that such modifications are also encompassed by the scope of the present invention.

In the first and second embodiments, the communication system 100 is applied to a CSMA-based communication system 100. However, the base station apparatus 34 may be applied to communication systems other than the CSMA-based one and, such other multiple access technology to be applied thereto includes, for example, TDMA (Time Division Multiple Access), CDMA (Code Division Multiple Access) and SDMA (Space Division Multiple Access). According to this modified example, the present invention can be applied to various types of communication systems. That is, it is acceptable so long as the base station apparatus 34 is one that receives signals from terminal apparatuses.

In the second embodiment, the transmitter 144 and the like, together with the measuring antenna 230, are provided independently of the base station antennas 14. This embodiment, however, is not limited to this structure alone, and, for example, the measuring antenna 230 only may be provided independently of the basestation antennas 14 and the transmitter 144 and the like connected to any of the basestation antennas 14 may be shared as the transmitter 144 and the like. In such a case, a switch is provided to a basestation antenna 14 to which the measuring antenna 230 is connected. According to this modification, the measuring antenna 230 may be disposed in a position convenient as well as appropriate for the detection of initial phase correction values, and the circuit may be made smaller in scale. The only condition for this is the independent provision of the measuring antenna 230.

Although the present invention has been described by way of exemplary embodiments, it should be understood that many changes and substitutions may further be made by those skilled in the art without departing from the scope of the present invention which is defined by the appended claims.

What is claimed is:

1. A radio apparatus, comprising:
   a radio unit for reference which receives transmission signals from an antenna for measurement by an antenna for reference so as to derive a first weighting factor and which transmits, from the antenna for reference, signals weighted with the first weighting factor;
   a correcting radio unit which receives transmission signals from the antenna for measurement by an antenna for correction so as to derive a second weighting factor and which transmits, from the antenna for correction, signals weighted with the second weighting factor;
   a rotation unit which operates, at the time of transmitting signals, the second weighting factor while rotating, by a phase rotation amount of 0, a correction value against a $\pi/2$ phase shifter for transmission for performing quadrature modulation in said correcting radio unit, and which operates, at the time of transmitting signals, the second weighting factor while rotating, by a phase rotation amount of $\pi$, a correction value against a $\pi/2$ phase shifter for transmission for performing quadrature modulation in said correction radio unit;
   a measuring unit which receives signals transmitted from the antenna for reference and the antenna for correction by the antenna for measurement and which measures the strength of received signals as signals level 1 when the phase rotation amount in the rotation unit is 0 and measures the strength of received signals as signal level 2 when the phase rotation amount in the rotation unit is π; and an estimation unit which determines the phase rotation amount in the rotation unit to be 0 when the signal level 1 measured is higher than the signal level 2 measured, and which determines the phase rotation amount to be π when the signal level 2 measured is higher than the signal level 1 measured, wherein said rotation unit rotates the correction value by the phase rotation amount determined.

2. A radio apparatus according to claim 1, further comprising an antenna switching unit which sets the antenna for correction while switching a plurality of antennas, wherein said estimation unit determines the phase rotation amount for each of the correcting antennas to be switched among the plurality of antennas.

3. A radio apparatus according to claim 1, further comprising a communication unit which communicates with a targeted terminal apparatus by using at least the antenna for measurement, the antenna for reference and the antenna for correction.

4. A radio apparatus according to claim 1, further comprising:
a communication unit which communicates with a targeted terminal apparatus by using at least the antenna for reference and the antenna for correction; and
a transmitter which transmits signals from the antenna for measurement to respectively derive the first weighting factor and the second weighting factor.

5. A radio apparatus according to claim 1, wherein said rotation unit includes: a storage unit which stores a correction value in a case when the phase rotation amount determined is 0; and an inversion unit which inverts the correction value if the correction value is phase-rotated to π.

6. A radio apparatus according to claim 1, wherein said rotation unit includes: a first storage unit which stores a first correction value in a case when the phase rotation amount determined is 0; a second storage unit which stores a second correction value in a case when the phase rotation amount determined is π; and a selector which selects the first correction value or the second correction value according to the amount rotated by said rotation unit.

7. A calibration method, comprising:
deriving a first weighting factor by receiving transmission signals from an antenna for measurement by an antenna for reference and transmitting, from the antenna for reference, signals weighted with the first weighting factor;
deriving a second weighting factor by receiving transmission signals from the antenna for measurement by an antenna for correction, transmitting, from the antenna for correction, signals weighted with the second weighting factor while rotating, by a phase rotation of 0, a correction value, against a π/2 phase shifter for transmission, for performing quadrature modulation, and transmitting, from the antenna for correction, signals weighted with the second weighting factor while rotating, by a phase rotation amount of π, a correction value, against a π/2 phase shifter for transmission, for performing quadrature modulation;
receiving signals transmitted from the antenna for reference and the antenna for correction by the antenna for measurement and, measuring the strength of received signals as signal level 1 when the phase rotation amount in the rotation unit is 0 and measuring the strength of received signals as signal level 2 when the phase rotation amount in the rotation unit is π; and
determining the phase rotation amount in the rotation unit to be 0 when the signal level 1 measured is higher than the signal level 2 measured, and determining the phase rotation amount to be π when the signal level 2 measured is higher than the signal level 1 measured.

8. A calibration method according to claim 7, further comprising setting the antenna for correction while switching a plurality of antennas, wherein said determining determines the phase rotation amount for each of the correcting antennas to be switched among the plurality of antennas.

9. A calibration method according to claim 7, further comprising communicating with a targeted terminal apparatus by using at least the antenna for measurement, the antenna for reference and the antenna for correction.

10. A calibration method according to claim 7, further comprising communicating with a targeted terminal apparatus by using at least the antenna for reference and the antenna for correction,
wherein said transmitting is such that signals are transmitted from the antenna for measurement to respectively derive the first weighting factor and the second weighting factor.

11. A calibration method according to claim 7, wherein said transmitting includes: outputting a correction value from a memory which stores a correction value in a case when the phase rotation amount determined is 0; and inverting the correction value if the correction value is phase-rotated to π.

12. A calibration method according to claim 7, wherein said transmitting includes: outputting a first correction value from a memory which stores a first correction value in a case when the phase rotation amount determined is 0; outputting a second correction value from a memory which stores a second correction value in a case when the phase rotation amount determined is π; and selecting the first correction value or the second correction value according to the rotation amount.

13. A program executable by a computer, the program including the functions of:
deriving a first weighting factor by receiving transmission signals from an antenna for measurement by an antenna for reference, storing the first weighting factor in a memory and transmitting, from the antenna for reference, signals weighted with the first weighting factor stored in the memory;
deriving a second weighting factor by receiving transmission signals from the antenna for measurement by an antenna for correction, storing the second weighting factor in a memory and transmitting, from the antenna for correction, signals weighted with the second weighting factor while rotating, by a phase rotation amount of 0, a correction value on the memory, against a π/2 phase shifter for transmission, for performing quadrature modulation and transmitting, from the antenna for correction, signals weighted with the second weighting factor while rotating, by a phase rotation amount of π, a correction value on the memory, against a π/2 phase shifter for transmission, for performing quadrature modulation;
receiving signals transmitted from the antenna for reference and the antenna for correction by the antenna for measurement and measuring the strength of received signals as signal level 1 when the phase rotation amount in the rotation unit is 0 and measuring the strength of received signals as signal level 2 when the phase rotation amount in the rotation unit is $\pi$;

storing the value of the signal level 1 and the value of the signal level 2 measured in the memory; and determining the phase rotation amount in the rotation unit to be 0 when the signal level 1 stored is higher than the signal level 2 stored, and determining the phase rotation amount to be $\pi$ when the signal level 2 stored is higher than the signal level 1 stored.

14. A program according to claim 13, the functions thereof further comprising setting the antenna for correction while switching a plurality of antennas, wherein said determining determines the phase rotation amount for each of the correcting antennas to be switched among the plurality of antennas.

15. A program according to claim 13, the functions thereof further comprising communicating with a targeted terminal apparatus by using at least the antenna for measurement, the antenna for reference and the antenna for correction.

16. A program according to claim 13, the functions thereof further comprising communicating with a targeted terminal apparatus by using at least the antenna for reference and the antenna for correction, wherein said transmitting is such that signals are transmitted from the antenna for measurement to respectively derive the first weighting factor and the second weighting factor.

17. A program according to claim 13, wherein said transmitting includes: outputting a correction value from a memory which stores a correction value in a case when the phase rotation amount determined is 0; and inverting the correction value if the correction value is phase-rotated to $\pi$.

18. A program according to claim 13, wherein said transmitting includes: outputting a first correction value from a memory which stores a first correction value in a case when the phase rotation amount determined is 0; outputting a second correction value from a memory which stores a second correction value in a case when the phase rotation amount determined is $\pi$; and selecting the first correction value or the second correction value to the rotation amount.

* * * * *